F. G. LAUSTER, Sr.
COVER.
APPLICATION FILED APR. 1, 1908.
904,972.
Patented Nov. 24, 1908.
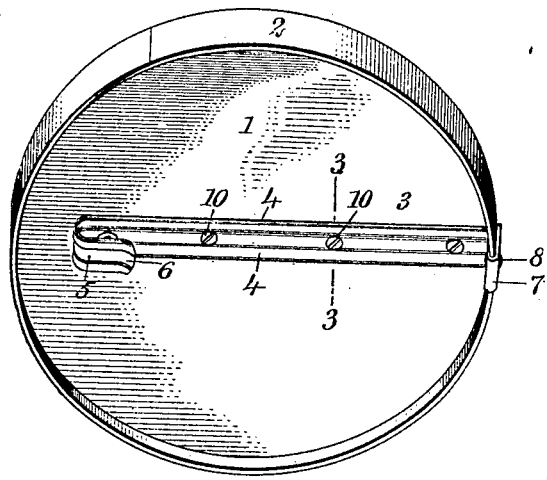
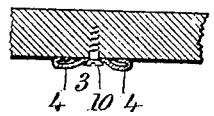
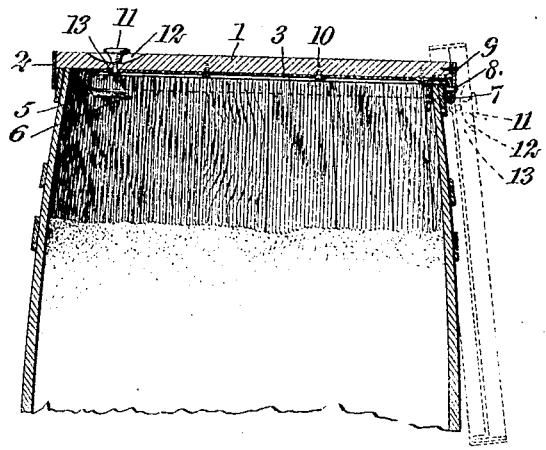
WITNESSES
INVENTOR
Frederick G. Lauster, Sr.
BY
ATTORNEYS

UNITED STATES PATENT OFFICE.

FREDERICK G. LAUSTER, SR., OF IONIA, MICHIGAN.

COVER.

No. 904,972.   Specification of Letters Patent.   Patented Nov. 24, 1908.

Application filed April 1, 1908. Serial No. 424,501.

*To all whom it may concern:*

Be it known that I, FREDERICK G. LAUSTER, Sr., a citizen of the United States, and a resident of Ionia, in the county of Ionia and State of Michigan, have invented a new and Improved Cover, of which the following is a full, clear, and exact description.

This invention relates to covers, and more particularly such covers as are adapted to be removably used with barrels, casks or the like.

The object of this invention is to provide a cover which is simple and inexpensive to manufacture, and which has means for removably mounting it adjacent to the side of the barrel or cask after it has been removed from the top, thus obviating the necessity of either holding the cover or placing it on the floor, while the material is being removed from the barrel.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which Figure 1 is a bottom perspective view of the cover; Fig. 2 is a longitudinal section of the device as applied to a barrel, and shows in dotted outline the position the cover assumes when removed from the top of the receptacle; and Fig. 3 is an enlarged sectional view on the line 3—3 of Fig. 1.

Before proceeding to a more detailed description of my invention, it should be understood that I provide means for holding a cover of a receptacle adjacent to the sides of the latter when it has been removed from the opening. This obviates in the removal of substances from the receptacle, the inconvenience of either taking off the cover entirely and placing it on the ground, or of holding it in a raised position when not needed.

Referring more particularly to the drawings, 1 represents a receptacle cover of any suitable material such as wood, tin, iron or the like, and having an annular rim 2. Removably mounted on the bottom of the cover is an elongated member 3 of any suitable material such as iron, tin or the like, and having its edges bent upon themselves to form flanges or ribs 4. The member 3 has one end suitably bent to form a hook 5, the latter having its extremity 6 outwardly disposed. At the opposite end the member is formed into a U-shaped offset 7 to receive the rim 2 of the cover, and extends on both sides thereof. A rivet 8 may be employed to secure the two sides of the offset and the rim together, while nails or screws 9 secure the extremity thereof to the rim and cover. Screws or nails 10 are used to secure the member 3 on the bottom of the cover and are located between the ribs 4.

A manual grip or handle 11, arranged in a recess 12 and having a retaining shank 13 which is removably secured to the under side of the member 3, serves to assist in the removal of the cover from the receptacle.

In the operation of my device, the cover is raised by means of the grip 11 and pushed back on the edge of the receptacle on the ribs 4 until the hook 5 comes in contact with the edge of the receptacle. As the latter is received by the hook, the cover assumes a position adjacent to the sides of the receptacle, and is supported in that position. In sliding the cover upon the edge of the receptacle, the screws 10 are prevented from engaging the edges thereof by the ribs 4. The extension 6 of the hook 5 is offset so that the latter can slip into engagement easily with the barrel edge. The grip 11 together with the hook 5 are located near the edge of the cover to render the operation of removing the cover easier. Further, it should be understood that although I preferably employ a grip 11 as shown, other means for lifting the cover, such as an under cut groove or the like, adapted to receive the fingers, could be used with advantage.

Having thus described my invention, I claim as new and desire to secure by Letters Patent,—

1. In combination with a receptacle cover, a strip of metal secured to the under side thereof along a diameter and terminating in a hook, the body portion of the strip serving as a guide in the removal of the cover, and said hook serving to support the cover adjacent to the side of the receptacle.

2. In combination with a receptacle, a removable cover, and means for guiding said cover on the edge of said receptacle in removing said cover, said means including a hook adapted to engage at the receptacle edge to hold said cover displaced.

3. In combination with a receptacle cover, an elongated member secured to the under side thereof and constituting a guide in the removal of the cover, said member having one end formed into a hook for receiving the edge of said receptacle.

4. In combination with a receptacle cover having a rim, a manual grip, an elongated member having the edges turned to form rims, said member having one end formed into a hook, and the other end formed into an offset to receive the rim of said cover, means for securing said rim to said offset, and means between said ribs for mounting said member on the cover, said ribs serving to guide said hook into engagement with the edge of a receptacle to hold said cover adjacent to the side thereof when said cover is removed from the opening of the receptacle.

In testimony whereof I have signed my name to this specification in the presence of two subscribing witnesses.

FRED. G. LAUSTER, Sr.

Witnesses:
HERBERT B. WEBBER,
MILTON M. McGEARY.